INVENTOR
HERBERT F. WILKINSON
BY
John H. Barney
AGENT

United States Patent Office 3,455,658
Patented July 15, 1969

3,455,658
INTERNAL TEMPERATURE CONTROLLING MEANS FOR CATALYTIC CONTACTING APPARATUS
Herbert F. Wilkinson, Fullerton, Calif., assignor to Union Oil Company of California, Los Angeles, Calif., a corporation of California
Filed Jan. 4, 1965, Ser. No. 423,045
Int. Cl. B01j 9/04
U.S. Cl. 23—289                                9 Claims

ABSTRACT OF THE DISCLOSURE

In a cylindrical high-pressure vessel, an apparatus for transporting temperature control fluid into said vessel, comprising a plurality of concentric tubes which enter the vessel through one aperture at one end wall and which terminate within said vessel at various levels.

---

This invention relates to an improved apparatus for controlling the internal temperature of high-pressure catalytic reactors, particularly reactors wherein exothermic or endothermic reactions are carried out by passing fluid reactants therethrough.

Conventional apparatus for carrying out exothermic or endothermic catalytic reactions at high pressures generally comprises an elongated cylindrical vessel enclosing and supporting one or more catalyst beds through which fluid reactants pass. The reactions are controlled by the addition of a temperature-control fluid directly into the reactant stream at one or more levels in the reactor. This temperature-control fluid is generally injected into the reactor by means of a series of nozzles which pass through the side-walls of the reactor at successive levels within a single bed, or between spaced beds in multi-bed catalytic reactors. The use of many such side nozzles is expensive from a mere welding standpoint. Furthermore, for operation at a given temperature and pressure, construction codes require much thicker vessel walls when side nozzles are utilized than are required when the side-walls are smooth, thus adding greatly to fabrication costs. Thick-walled vessels are not only expensive per se, but the greater weight thereof places restrictions on the size of vessels which can be constructed under present day fabricating procedures. Thus, for the dual purpose of reducing costs and enabling the construction of larger units, it would be highly desirable to completely eliminate side-nozzles in high-pressure catalytic conversion reactors.

The primary object of this invention is to provide an apparatus which permits temperature control of reactions conducted in one or more catalyst beds of a high-pressure catalytic reactor, while eliminating the use of externally mounted, high-pressure, side nozzles.

Other objects and advantages of this invention will be apparent from the description which follows.

Briefly, this invention comprises in combination an elongated, cylindrical, high-pressure catalytic reactor and fluid injection apparatus composed of a plurality of concentrically disposed tubes for injecting a temperature-control fluid into various dispersal zones within the reactor. In its simplest aspect, the injection apparatus comprises (1) a first tube disposed lengthwise within the reactor and joined at one end in a fluid-tight union with one end-wall of the reactor, the opposite end of the tube terminating within the reactor at a zone spaced inwardly from the opposite end wall; (2) a second shorter tube disposed concentrically about the first tube and spaced therefrom, the second tube being joined at one end in a fluid-tight union with the same end wall to which said first tube is joined, the opposite end thereof terminating within the reactor at a shorter distance from the one end-wall than the first tube; and (3) separate fluid-inlet conduits communicating with the interior of the first tube and with the annular channel included between the first and second tubes, said fluid-inlet conduits passing through the end wall to which said tubes are joined.

Additionally, successively shorter tubes of successively larger diameter may be disposed concentrically around the second tube and likewise joined to the same end wall, with additional fluid-inlet conduits communicating in like manner with the included annular channels. By this arrangement, temperature-control fluid may be separately injected into the central tube, and into each annular channel between successive outer tubes, and be dispersed at axially spaced intervals within the reactor, preferably by means of fluid distribution means connected to the free end of each of the tubes.

While the invention is broadly applicable to single bed reactors, it is preferred that the injection apparatus be used in conjunction with upright, multi-bed, catalytic reactors. In such a reactor, the outermost tube extends from the upper end wall through the first catalyst bed and terminates at a distribution zone between the first and second catalyst beds. The next outermost tube extends from the upper end wall concentrically through the outer tube, through the second catalyst bed, and terminates at a second distribution zone located between the second bed and the third bed. In reactors designed to contain more than three catalyst beds, each successive tube would extend from the same supporting upper end wall to beyond the terminal portion of the adjacent outer tube, through the succeeding catalyst bed, and terminate in a distribution zone between that bed and the next succeeding bed. The innermost tube normally terminates in a distribution zone immediately preceding the last or lowermost catalyst bed.

The terminal portion of each tube is provided with a distributor means for achieving substantially uniform radial distribution of the temperature-control fluid in such a manner as to insure intimate and thorough mixing of the fluid with the reactant stream leaving the catalyst zone immediately thereabove. Each distributor means is preferably attached to the end of each tube through a deformable, bellows-shaped, annular coupling, and is rigidly attached through a fluid-tight seal to the adjacent outer surface of the inner adjacent tube. Such a coupling arrangement allows for differential thermal expansion and contraction of the individual tubes.

During operation of the reactor, the temperature of each successive catalyst bed is independently controlled by introducing a quantity of temperature-control fluid between adjacent catalyst beds so as to regulate the temperature of the reactants passing from one bed to the next. This may be done by embedding thermocouples in each catalyst bed and adjusting the fluid flow through inlet valves in response to the change in reaction temperature. The overall effect is to maintain a substantially constant average temperature throughout the length of the reactor, thereby preventing overheating, and possible run-away reactions.

Additionally, in order to insure that the temperature-control fluid is maintained at a substantially constant temperature as it passes through the internal conduits traversing the successive catalyst beds, the portions of each tube which are in direct thermal contact with an adjacent catalyst bed are thermally insulated.

The type of temperature-control fluid which is introduced into the reactor will obviously depend upon the type of reaction being carried out. If the reaction is exothermic, such as hydrocracking, a cold quench stream would be introduced. On the other hand, if the reaction is endothermic, such as naphtha reforming, a heating fluid may be required. This invention is particularly valuable in multi-bed hydrocracking reactors, wherein a cold quench stream comprising essentially hydrogen is introduced between the spaced beds so as to maintain control of the exothermic reaction. Exothermic reactions, such as hydrocracking, are generally conducted at pressures of about 500 to 4,000 p.s.i. and temperatures in the range of 500° to 850° F. It is normally desirable in hydrocracking reactions to maintain the temperature gradient within a 10° to 50° F. range.

The aspects of this invention which are capable of illustration, are shown in the accompanying drawings.

Figure 1:
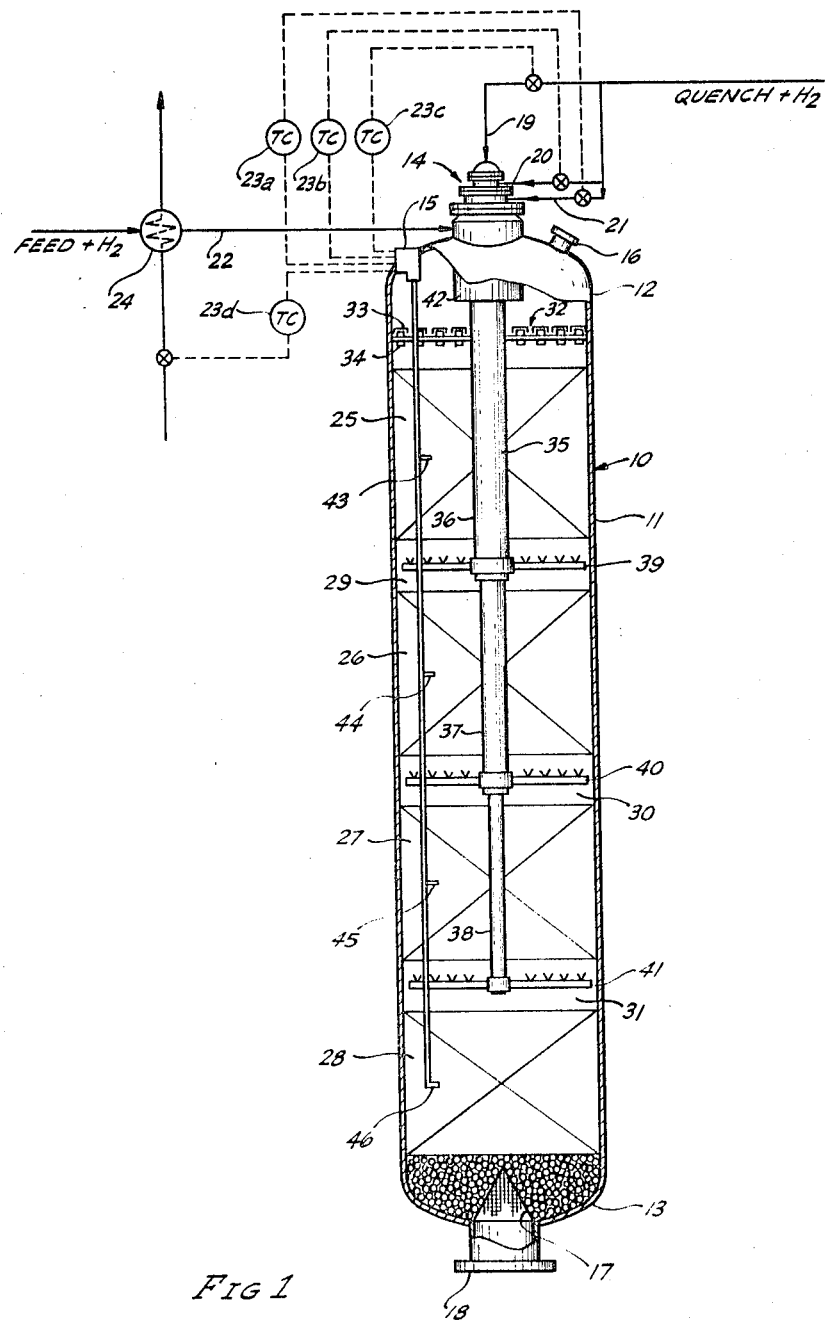
FIGURE 1 is a schematic vertical section of a preferred embodiment of this invention.
Figure 2:
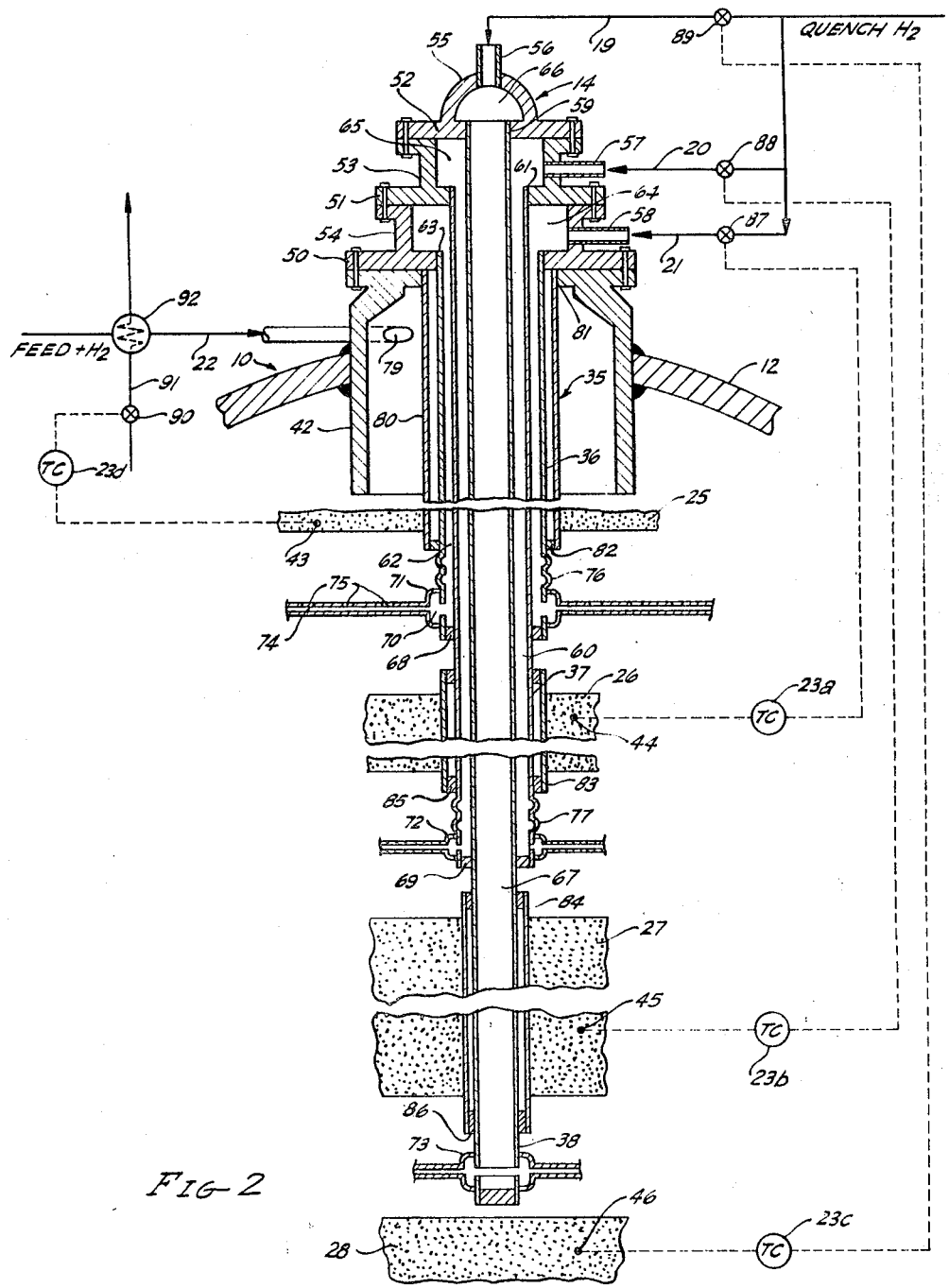
FIGURE 2 is an elevation in section of the preferred bell-shaped end wall in combination with the fluid-injection apparatus of this invention.

Referring to FIGURE 1, reactor 10 comprises a substantially cylindrical, vertical shell 11 having a dish-shaped upper end wall 12 and lower end wall 13. The upper end wall 12 includes a generally bell-shaped superstructure 14 forming a pressure-retaining portion thereof, a thermowell 15, and an access nozzle 16 for maintaining the vessel. The lower end wall 13 is provided with a grating 17, located immediately above the outlet conduit 18 to prevent escape of solids from the vessel while at the same time permitting the product effluent to be discharged. The bell-shaped superstructure 14, which will be discussed in greater detail in connection with FIGURE 2, is provided with valved inlets 19, 20 and 21 for supplying the reactor with a temperature-control fluid, and a reactant inlet line 22. Inlets 19, 20 and 21 are provided with suitable motor valves which operate in response to temperatures sensed by thermocouples 44, 45 and 46 via temperature controller-recorders 23a, 23b and 23c. The temperature of the reactants in the first catalyst bed 25 is controlled by regulating the temperature of the feed mixture entering the top of the tower through inlet 22 from the heat exchanger 24. The heat exchanger is controlled by means of temperature controller-recorder 23d responsive to thermocouple 43. The thermocouples are buried within each respective catalyst bed and communicate with the temperature controller-recorders via thermowell 15.

Within the shell 11 is a plurality of spaced catalyst beds 25, 26, 27 and 28, as well as a plurality of intermediate zones 29, 30 and 31 wherein the temperature-control fluid is dispersed. Above the first bed 25 is located a liquid-vapor mixing and distributing means 32 which may consist of a transverse partition fitted with a plurality of bubble caps 33 and downcomers 34. Also within the shell is the temperature-control fluid injection apparatus, shown generally as 35, which extends from and communicates with the exterior of the vessel 10 through bell-shaped superstructure 14 which forms a portion of end wall 12. The fluid-injection apparatus 35, in this instance, is composed of three concentrically disposed tubes 36, 37, and 38, each of which forms a fluid-tight union with the superstructure 14. Each tube is terminated by radial fluid-distribution devices 39, 40 and 41. Suitable distribution devices include e.g., radial arms extending from each respective central conduit, or any other conventional device for achieving a substantially uniform radial distribution of fluid. One specific modification, not shown, may comprise a circular, hollow, perforated tray attached to the side walls of the reactor, and communicating centrally with the end of each tube.

Referring specifically to the injection apparatus, the outermost tube 36 extends lengthwise from the superstructure 14 through the first catalyst bed 25 and terminates in zone 29 intermediate the first bed 25 and the second bed 26. The next inner tube 37 extends from the superstructure 14 concentrically within tube 36, through the second catalyst bed 26, and terminates in zone 30 intermediate the second bed 26 and the third bed 27. The third (innermost) tube 38, likewise extends from the superstructure 14 concentrically through tube 37, through catalyst bed 27, and terminates in zone 31 intermediate the third bed 27 and the lowermost bed 28.

Above the liquid-vapor mixing and distributing means 32 is located a feed-distribution tube 42. In this figure, it is suitably shown as a tubular conduit disposed concentrically about the temperature-control fluid injection apparatus 35. Alternate and/or supplemental inlets (not shown) may be used in lieu of conduit 42.

During operation of the reactor, reactants supplied to the top of the tower through feed-distribution tube 42 are distributed and mixed on tray 32 and pass downwardly through each succeeding catalyst bed, wherein the desired catalytic conversion is effected. As the reactants pass through each bed, the reaction temperature therein will either increase or decrease in accordance with the type of reaction being carried out. The thermocouples in each bed act upon a corresponding temperature controller-recorder independently and continuously, and the latter then actuate a corresponding motor valve and thus control the supply of fluid to each zone.

Specifically, in a hydrocracking process the temperature of the first catalyst bed 25 is controlled by regulating the temperature of the reactants entering the tower as previously described. As the reactants pass from bed 25 through intermediate zone 29, the temperature in catalyst bed 26 is sensed by thermocouple 44 which acts in conjunction with temperature controller-recorder 23a to regulate the quantity of temperature-control fluid supplied to conduit 36 via line 21. If the reaction temperature increases significantly, a cold hydrogen quench fluid will be introduced in zone 29 via the radial-arm fluid distribution device 39, thereby reducing the temperature throughout zone 26. As the reactants pass from catalyst bed 26 to bed 27 through intermediate zone 30, the temperature in bed 27 is sensed via thermocouple 45 which acts in conjunction with temperature controller-recorder 23b to regulate the supply of the hydrogen quench fluid being supplied via conduit 37 and line 20. The reaction temperature in catalyst bed 28 is similarly controlled in intermediate zone 31 by introducing quench fluid via conduit 38 and line 19. In catalytic reactors containing additional catalyst beds, the reaction in each additional bed is independently controlled in a like manner.

Referring now to FIGURE 2, the generally bell-shaped superstructure 14, shown positioned axially atop reactor 10, comprises a plurality of vertically spaced annular flange members 50, 51 and 52 extending inwardly from integral, tubular spacing rings 53 and 54 which separate successive flange members, the top of the superstructure being enclosed by a dome-shaped closure member 55. The inside diameter of each flange member becomes progressively larger at lower levels in the superstructure. The outer extremities of each flange are shown bolted to the top of each tubular spacing ring, so as to facilitate removal of one or more tubes without necessitating removal of the entire unit. Separate inlet conduits 57 and 58 communicate, preferably tangentially, through the periphery of each tubular spacing ring with the interior of the structure. Inlet conduit 56 communicates through the periphery of the dome-shaped closure member 55.

The fluid injection apparatus 35, positioned within reactor 10, contains a plurality of concentrically disposed tubes 36, 37 and 38. Each tube and its mating annular flange is provided with complementary threaded portions for supporting the upper end of each tube. The innermost tubular conduit 38 terminates at the upper end in a fluid-tight union with uppermost flange 52 at threaded junction 59. The opposite end of tube 38 terminates within the reactor in a zone immediately above the lowermost catalyst bed 28. Tube 37 is disposed concentrically about tube 38 and defines an annular conduit 60 therebetween. Tube 37 terminates at its upper end in a fluid-tight union with flange 51 at threaded junction 61. The opposite end of tube 37 terminates in the zone between catalyst beds 26 and 27. The outermost tube 36 of the fluid injection apparatus is positioned concentrically about tube 37, defining an annular conduit 62 therebetween. Tube 36 terminates at its upper end in a fluid-tight union with flange 50 at threaded junction 63. The opposite end of tube 36 terminates in the zone intermediate catalyst beds 25 and 26.

The temperature-control fluid is admitted to chambers 64, 65 and 66 prior to distribution to the various zones via conduits 62, 60 and 67. The lower ends of the outer tubes 36 and 37 rigidly affixed to the adjacent inner tubes 37 and 38 respectively, by means of fluid-tight spacing rings 68 and 69 which may be welded to both tube surfaces. A series of circumferential perforations 70 are provided in the lower portions of tubes 36, 37 and 38 communicating with the interior of annular manifolds 71, 72 and 73 which are welded or otherwise affixed around the lower ends of the tubes. A plurality of hollow fluid-distribution arms 74 extend radially outwardly from each annular manifold, and are suitably perforated along their lengths as indicated at 75 in order to provide substantially uniform radial distribution and admixing of temperature-control fluid with reactants passing downwardly in the reactor.

Immediately above the annular manifolds 71 and 72, a short section of the respective supporting tubes 36 and 37 is crimped to form flexible expansion bellows 76 and 77 to provide for differential linear thermal expansion and contraction of adjacent tubes. It should be noted that since tubes 36, 37 and 38 are not required to withstand high pressures, they may be constructed of lightweight metal which may be crimped to form flexible expansion bellows.

The reactants are supplied to the top of reactor 10 via feed inlet line 22 which traverses the cylindrical wall of feed distribution tube 42 in such a manner that the reactants enter tangentially at 79, thus assuring uniform distribution in the top of the reactor.

Since the temperature of the reactants entering the top of the reactor and the temperature of the first catalyst bed 25 each differ considerably from that of the temperature-control fluid in conduit 62, a metallic or ceramic heat shield 80 is positioned around tube 36 so as to provide a thermal barrier between the reactants and the temperature-control fluid. The heat shield 80 is threaded into flange 50 at junction 81, and extends downwardly through the first bed 25 and terminates at a point above the bellows-like coupling 76. The lower end of heat shield 80 is provided with an attached spacing ring 82 so as to maintain a slideable contact with tube 36. The inner tubes 37 and 38 are similarly provided with like heat shields 83 and 84 respectively, as well as spacing means 85 and 86. Other types of thermal insulation may be employed in lieu of the heat shields, e.g., asbestos sheathing or the like. The temperature-control fluid which passes through conduits 60 and 67 provide an additional insulating effect over the unexposed portions of each tube.

The diagrammatically illustrated temperature-control system is composed of thermocouples 43, 44, 45 and 46, each cooperating respectively with temperature controller-recorders 23a, 23b, 23c and 23d to operate respective flow control valves 87, 88 and 89 as well as flow control valve 90 in fuel line 91 to fired heater 92. The detailed operation of this system has been previously described in connection with FIGURE 1.

There are many modifications and noncritical features of this invention not specifically referred to herein which will be apparent to those skilled in the art, and which are within the scope of the invention as set forth in this specification and encompassed in the following claims.

Having thus described the invention, I claim:

1. In an elongated, cylindrical, high-pressure vessel adapted for use as a catalytic reactor without externally mounted, side nozzles, said vessel terminating at opposite extremities in generally dish-shaped end walls and having a feed inlet near one extremity thereof and a product outlet near the other extremity, the improvement in apparatus for injecting fluids at a plurality of levels therein which comprises:
   (a) a plurality of vertical, essentially straight tubes located mainly within said vessel, disposed and supported concentrically lengthwise therein so as to define an inner cylindrical conduit and at least one surrounding annular conduit, each of said tubes projecting through and a short distance outside one of said end walls, the outermost of said tubes traversing said one end wall in a fluid-tight juncture therewith and terminating within said vessel a relatively short distance from said one end wall, the remaining successively inwardly spaced of said tubes terminating within said vessel at successively greater vertical distances from said one end wall than the next adjacent outer tube, thereby leaving an exposed terminal portion of each tube projecting beyond the end of each adjacent outer tube, and with the end of each tube disposed at properly spaced horizontal intervals for delivering temperature-control fluid to said vessel;
   (b) closure means sealing the exterior ends of said cylindrical conduit and each of said annular conduits;
   (c) separate fluid-inlet conduits communicating exteriorly of said vessel with said cylindrical conduit and each of said annular conduits; and
   (d) radial fluid distribution means, communicating with the interior end of said cylindrical conduit and with the interior end of each of said annular conduits within said vessel, for uniformly distributing fluid over the cross-sectional area thereof.

2. The vessel of claim 1 including a series of vertically spaced catalyst beds therein, and wherein said radial distribution means are disposed in the spaces between said beds.

3. The vessel of claim 1 wherein the exposed terminal portion of said tubes immediately above said radial distribution means is provided with flexible expansion bellows.

4. The vessel of claim 1 wherein said exposed terminal portion of each tube is thermally insulated.

5. A high-pressure vessel adapted for use as a catalytic reactor comprising in combination:
   (a) a pressure-retaining, elongated, cylindrical shell without externally mounted side nozzles, said vessel terminating at opposite extremities in generally dish-shaped end walls, having a feed inlet near one extremity thereof and a product outlet near the other extremity and containing a plurality of vertically spaced catalyst beds disposed therein;
   (b) a generally bell-shaped external superstructure forming a portion of the top end wall, said superstructure comprising a plurality of vertically spaced annular flange members extending horizontally inwardly from said superstructure, the inside diameter of each of said annular flange members becoming progressively larger at lower levels in said superstructure;
   (c) separate fluid inlet conduits communicating through the side wall of said superstructure between each of said flange members with the interior thereof;
   (d) a first essentially straight tube disposed axially within said reactor and terminating at one end in a fluid-tight union with the uppermost of said flange members, the opposite end thereof terminating within the reactor in the interspace immediately preceding the lowermost catalyst bed;
   (e) at least one additional tube disposed concentrically about said first tube, each of said additional tubes terminating at one end of a fluid-tight union with one of said flange members, the opposite ends thereof terminating within said reactor in successively higher interspaces between said catalyst beds, thereby leaving an exposed terminal portion of each tube projecting beyond the terminal portion of each adjacent outer tube;

(f) fluid distribution means attached to said opposite ends for uniformly distributing a temperature-control fluid over the cross-sectional area of said reactor;

(g) a feed distribution tube disposed concentrically about the upper portion of the outermost of said tubes and thermally insulated therefrom, said distribution tube extending inwardly a short distance into said reactor and terminating between said top end wall and the first catalyst bed; and (h) a feed inlet line communicating tangentially through the upper side wall of said feed distribution tube with the interior thereof.

6. The reactor of claim 5, wherein said exposed terminal portions of each tube are thermally insulated.

7. The reactor of claim 5 wherein the terminal portion of each of said additional tubes immediately above said distribution means is provided with flexible, generally cylindrical expansion bellows.

8. The reactor of claim 5 including in addition:

(i) temperature-sensing means positioned in each of said catalyst beds;

(j) flow-control valves in each of said fluid-inlet conduits; and (k) control means responsive to said temperature sensing means for separately actuating each of said flow-control valves.

9. The reactor of claim 5 wherein said catalyst beds comprise a hydrocracking catalyst.

References Cited
UNITED STATES PATENTS

| | | | |
|---|---|---|---|
| 2,336,879 | 12/1943 | Mekler | 23—288.92 X |
| 2,512,586 | 6/1950 | Stengel | 23—288.9 |
| 2,632,692 | 3/1953 | Korin et al. | 23—288 |
| 2,937,923 | 5/1960 | Shapleigh | 23—288.92 X |
| 3,235,344 | 2/1966 | Dreyer et al. | 23—289 |

MORRIS O. WOLK, Primary Examiner

M. D. BURNS, Assistant Examiner

U.S. Cl. X.R.

23—288, 288.91